United States Patent [19]

Chan et al.

[11] 4,025,012

[45] May 24, 1977

[54] MODULAR DECORATIVE STRUCTURE

[76] Inventors: David M. F. Chan, 1405 Arch St.; Michael L. F. Chan, 1407 Arch St., both of, Berkeley, Calif. 94708

[22] Filed: July 11, 1975

[21] Appl. No.: 595,211

[52] U.S. Cl. ..................... 248/163; 248/152; 248/174; 248/318; 428/542

[51] Int. Cl.$^2$ ..................... F16M 11/32

[58] Field of Search ............ D29/1 B; 46/53, 58; 206/150; 211/60 A, 72, 73; 248/127, 146, 151, 152, 163, 174, 317, 318, 346, 459; 428/4, 5, 542

[56] References Cited

UNITED STATES PATENTS

| | | | |
|---|---|---|---|
| 546,456 | 9/1895 | Montgomery | 46/58 |
| 949,538 | 2/1910 | Igelstroem | 211/72 |
| 1,179,227 | 4/1916 | Schiavone | 248/346 |
| 1,548,410 | 8/1925 | Derbyshire | 248/163 |
| 1,790,551 | 1/1931 | McCue | 339/256 R |
| 2,026,950 | 1/1936 | Miller | 248/318 |
| 2,862,321 | 12/1958 | James | 428/5 |
| 3,041,765 | 7/1962 | Paar | D29/1 B |
| 3,181,112 | 4/1965 | Bonhomme | 339/256 R |
| 3,247,315 | 4/1966 | Miller | 339/256 R |
| 3,382,986 | 5/1968 | Pfeiffer | 248/174 |

OTHER PUBLICATIONS

Avon Products Catalog, p. 14, Dec. 1965, item in upper left hand corner.

House Beautiful, p. 121, Dec. 1950, item in center right of page.

*Primary Examiner*—Lawrence J. Staab

*Attorney, Agent, or Firm*—Robert R. Tipton

[57] ABSTRACT

A modular support element comprising a generally rectangular sheet of stiff deformable material having a large opening therein, is formed into a generally cylindrical shape in which the two diametrically opposite corners of the sheet are fastened to each other and means are provided for connecting several of the modular structures together along with a base and device for holding objects to form a wide variety of structures having decorative and functional purposes.

6 Claims, 14 Drawing Figures

MODULAR DECORATIVE STRUCTURE

BACKGROUND OF THE INVENTION

This invention relates generally to decorative structures and in particular to modular structures having decorative and utilitarian purposes.

Generally the structures of the prior art were designed to particularly support objects or serve a single decorative purpose.

Structures that perform such multitude of functions and decorative purposes generally require many parts and therefore increase costs of manufacture.

SUMMARY OF THE INVENTION

The structure of the present invention comprises several modular support elements, each support element comprising a generally rectangular sheet of stiff deformable material having a large circular opening therein, with the sheet deformed to define a cylinder with diametrically opposed corners being connected together with each modular support element adapted to be connected to each other or to a base or means for holding an object.

It is therefore, an object of the present invention to provide a utilitarian and decorative structure.

It is a further object of the present invention to provide a structure having a basic modular unit which can be connected to provide a variety of decorative and utilitarian structures.

It is another object of the present invention to provide a modular and utilitarian structure having a minimum of basic parts which can provide a maximum of different modular configurations.

It is still a further object of the present invention to provide a modular and utilitarian decorative structure having a multiple purpose of supporting pots, candles, terreriums, aquariums and dried flower arrangements.

It is still another object of the present invention to provide a modular and utilitarian decorative structure that can be assembled as a sculpture unit or wall plaque.

These and other objects of the present invention will become manifest upon study of the following detail description when taken together with the drawings.

DESCRIPTION OF THE PREFERRED EMBODIMENT

Figure 1:
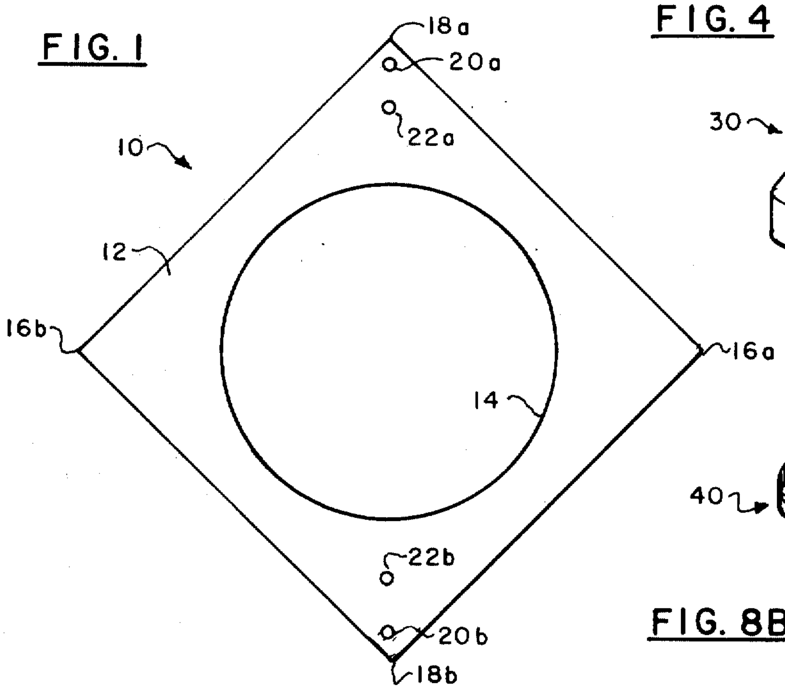
FIG. 1 is a plan view of the sheet of stiff deformable material prior to its being deformed into a cylinder.

Referring to FIG. 1 there is illustrated the shape of a typical modular support element 10 prior to its being rolled into its cylindrical form. Support element 10 comprises basically a generally rectangular sheet 12 having therein a large opening 14 whose diameter is greater than one-half the width of sheet 12. Diametrically opposite corners **16*a* and 16*b* are adapted to be connected to each other while diametrically opposite corners 18*a* and 18*b* are adapted to act as point supports, as described below, with holes 20*a* and 20*b* and at 22*a* and 22*b* used for connection of several modular support elements 10** to each other.

Figure 3:
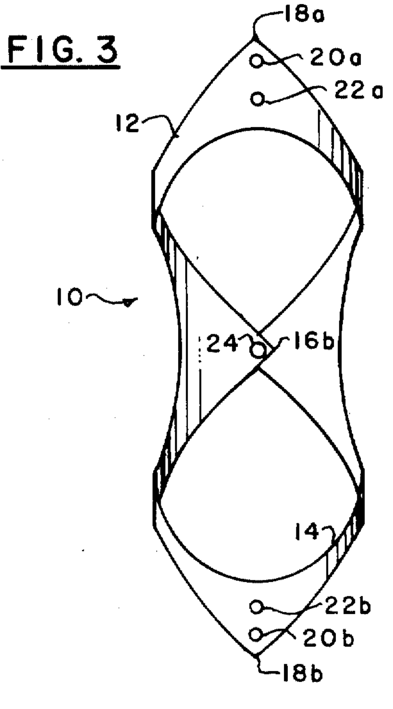
FIG. 3 is a view of the sheet of deformable material after it is rolled into a cylinder taken 90° to the view of FIG. 2.
Figure 2:
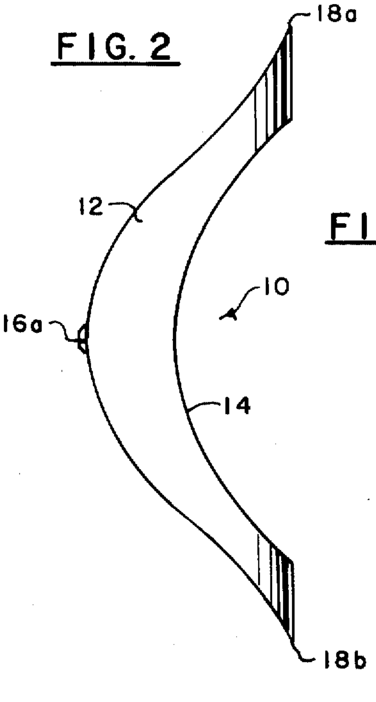
FIG. 2 is a side view of the sheet of stiff deformable material after it is rolled into a cylinder.
Figure 6:
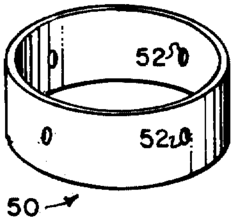
FIG. 6 is a large diameter connector ring for use in conjunction with several of the modular support elements of FIGS. 2 and 3.

With reference to FIGS. 2 and 3, sheet 12 is deformed into a generally cylindrical shape in which corners **16*a* and 16*b* are brought together and connected as by spot welding or the like, as shown in FIG. 3, with a hole 24 provided at the point of connection for the purpose of connecting element 10 to other items. With reference to FIG. 6 there is illustrated a connector ring 50 in which holes 52 are arranged equiangularly about ring 50. Although only four holes are shown in FIG. 6, any number of holes may be provided depending upon the diameter of ring 50 to accommodate a like number of modular support elements 10. Holes 52 as well as holes 20*a*, 20*b*, 22*a*, 22*b* and 24** are all adapted to receive a single size machine screw.

Figure 7:
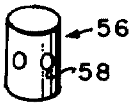
FIG. 7 is a small connector element for use in conjunction with connection of several modular support elements shown in FIGS. 2 and 3.

With reference to FIG. 7 there is illustrated a small diameter connector element 56 having therein equiangularly spaced holes 58 which are drilled and tapped to receive a machine screw (not shown). The diameter of connector 56 is such that three modular support elements may be connected thereto to form a tripod type stand.

Figure 4:
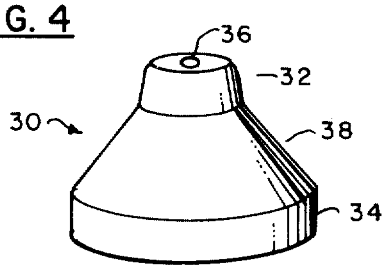
FIG. 4 is an isometric view of a typical base for use with the modular support elements of FIGS. 2 and 3.
Figure 5:
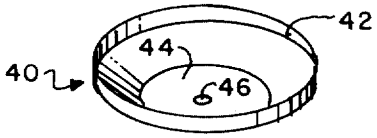
FIG. 5 is an object holder for use in conjunction with the modular support element shown in FIGS. 2 and 3.
Figure 8B:
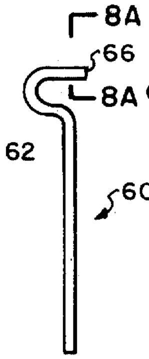
FIG 8B is a side view of the support bracket of FIG. 8A.
Figure 8A:
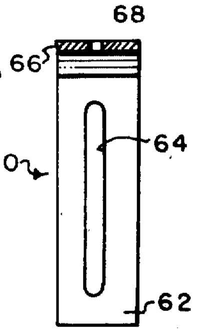
FIG. 8A is a front elevational view of a connector support bracket for use in conjunction with the modular support elements of FIGS. 2 and 3, the base of FIG. 4 and the object support of FIG. 5.

With reference to FIG. 4, there is illustrated a typical base support for use in conjunction with modular support element 10. Base 30 comprises a flared base of support portion 34 tapered down to define a connector support 32 having at its center a hole 36 adapted to receive a machine screw (not shown) and be of the same size as hole 24. With reference to FIG. 5 there is shown an object support cup 40 comprising a flared outer edge 42 and a dished inner portion 44 having in the center thereof a hole 46 adapted to receive a machine screw and be the same diameter as hole 36 of FIG. 4 and hole 24 in modular support element 10.

With reference to FIG. **8*a* and 8B there is shown a support bracket 60 having a body portion 62 within which is an elongated slot 64 which is used for adjusting the height of the bracket with the deformed end 66 arranged perpendicular to body portion 62. A threaded hole 68 is disposed at deformed end 66 and is adapted to receive a machine screw of a size which is adapted to fit holes 6, 36 and 24**.

Figure 9:
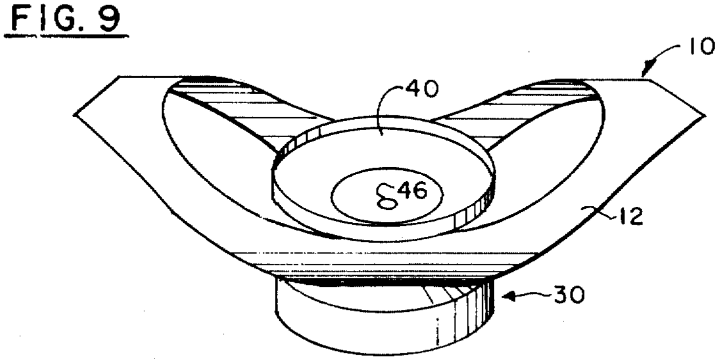
FIG. 9 is an isometric view of an assembled supporting structure for a candle using a singular modular support element, a base, and an object support.

With reference to FIG. 9 there is illustrated an assembled structure using one modular support element 10 with base support 30 connected to object support 40 and element 10 using a single bolt passes through holes 46, 24 and 36 to connect the unit together.

Figure 9A:
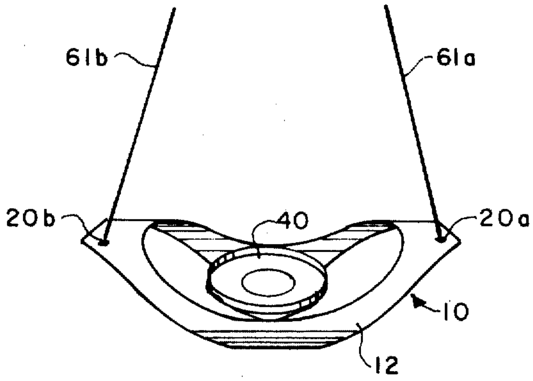
FIG. 9A is an isometric view of an assembled support structure for a candle that is suspended by two cords or wires.

With reference to FIG. 9A, one modular element 10 is connected to an object support 40 using a single bolt passing through holes 46 and 24. The unit is suspended by cords or wires 61*a* and 61*b* connected to element 10 through holes 20*a* and 20*b*, respectively.

Figure 10:
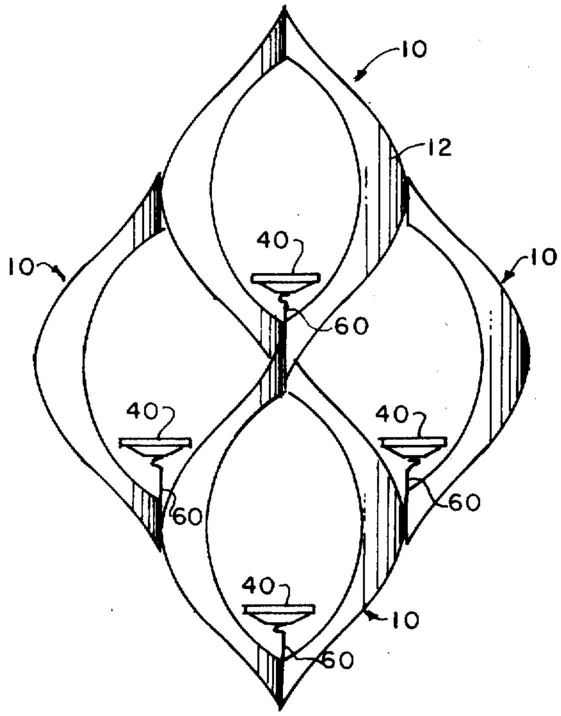
FIG. 10 is a elevational view of a number of modular support elements used in conjunction with the object support of FIG. 5 and brackets of FIG. 8A and 8B.

With reference to FIG. 10 a plurality of modular units 10 are connected together as shown, typically with a machine screw (not shown) passing through holes 22*a*, 22*b*, 20*a* and 20*b* to connect together the centrally disposed elements 10, while the two side elements 10 are connected to the central element using holes 22*a* and 22*b*, respectively, through each of the holes 24 in the centrally disposed assembly.

It will also be noted that object holder 40 supported by support bracket 60 is connected between support elements 10 such that any object placed on object holder 40 is "framed" by elements 10. The height of object holder 40 can be adjusted by loosening the machine screws holding elements 10 together and sliding it up or down with the machine screw (not shown) passing through slot 64 of bracket 60.

Figure 11:
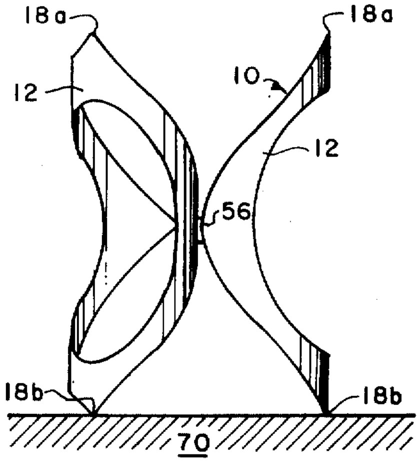
FIG. 11 is an elevational view of the modular support elements used in conjunction with the connector of FIG. 7.

With reference to FIG. 11 there is illustrated a typical stand for supporting a flower pot or the like utilizing at least three modular support elements 10 equiangularly spaced about connector 56 and fastened thereto with machine screws passing through holes 24 into drilled and tapped holes 58. Unconnected corners 18*b*, it can be seen, rest on surface 70. This of course would require that the material of rectangular sheet 12 of modular support element 10 must be stiff enough or rigid enough to provide such support. It has been found that 24–32 gauge steel will be adequate to support weights of up to 30 lbs.

Figure 12:
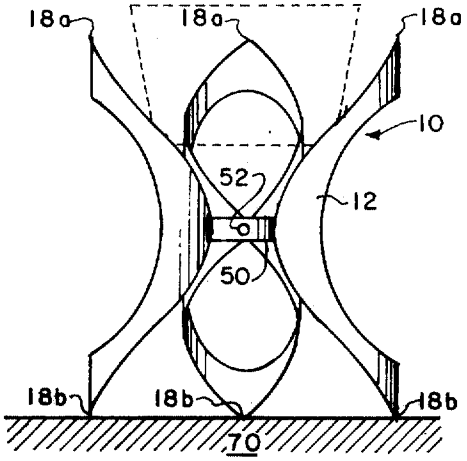
FIG. 12 is an elevational view of several of the modular support elements used in conjunction with the connector of FIG. 6.

With reference to FIG. 12 there is shown an example of a number of modular support elements 10, being connected to support ring 50 by means of machine screws passing through holes 24 of elements 10 and 52 of ring 50. The front element 10 is not shown in order to show ring 50. Ring 50 of the present embodiment is illustrated to connect to 5 elements 10. If a connector ring for a greater number, say 5, 6 or 7, of elements 10 were needed, the diameter of ring 50 could be expanded accordingly. It will also be noted that the assembled elements also rest on unconnected corners 18*b* on surface 70. Since a greater number of elements are used in this configuration it is therefor possible for the same gauge metal of element 10 to support a much greater weight.

It can also be seen that other arrangements are possible with varying numbers of elements 10 connected in various fashions using base 30 connector bracket 60, support element 40 and either rings 50 or 56 to provide an infinite number of decorative and structural supports. It is also possible to use holes 20*a*, 20*b* or 22*a*, 22*b* with strings or cords to provide a decorative structure or supporting structure that hangs.

It can also been seen that in some instances, in order to provide a "clean" surface, holes 20*a*, 20*b*, 22*a* and 22*b* need not be provided or may be provided as particularly required for a certain structure. Thus, for a structure as shown in FIGS. 9, 11 and 12, holes 20*a*, 20*b*, 22*a* and 22*b* are not required. However, as shown in FIG. 10, holes 22*a* and 22*b* would be required only in the outside modular support elements 10 while holes 20*a* and 20*b* would be required in the central combination of elements 10.

It also can be seen in FIGS. 11 and 12 that a second modular structural unit can be connected to corners 18*a* by means of holes 20*a* when connected to corners 18*b* and holes 20*b* of an identical structural unit mounted on top. Thus, in that particular combined structure the lower unit would not require holes 22*a*, 22*b* and 20*b*, while the upper structure would not require holes 20*a*, 22*a* and 22*b*.

Thus, is described a modular structure which can be used for decorative and supporting purposes.

We claim:

1. A structure comprising
a modular support element comprising a generally rectangular sheet of stiff deformable material having
means defining a generally circular opening in said sheet said opening having a diameter greater than one-half the width of said sheet
said sheet being deformed into a generally cylindrical shape with two diametrically opposed corners of said sheet connected to each other,
a base disposed under said modular support element,
means for holding an object disposed on said modular support element, and
means connecting said base and said means for holding an object to said support element.

2. A structure comprising
a modular support element comprising a generally rectangular sheet of stiff deformable material having
means defining a generally circular opening in said sheet said opening having a diameter greater than one-half the width of said sheet,
said sheet being deformed into a generally cylindrical shape with two diametrically opposed corners of said sheet connected to each other,
means for connecting said support element to like support elements comprising
a generally cylindrical connector element connecting at least three of said support elements together proximate the point of connection of said diametrically opposed corners.

3. A structure comprising
a modular support element comprising a generally rectangular sheet of stiff deformable material having
means defining a generally circular opening in said sheet said opening having a diameter greater than one-half the width of said sheet,
said sheet being deformed into a generally cylindrical shape with two diametrically opposed corners of said sheet connected to each other,
means for holding an object disposed on said modular support element,
means connecting said means for holding an object to said modular support element, and
means connecting said modular support element to like modular support elements.

4. The support structure as claimed in claim 1 wherein said means for holding an object comprises a generally planar base portion, a generally frusto conical sidewall tapering outwardly from and connected to said base, a generally vertical lip portion extending upwardly from and connected to said sidewall, and means disposed in said planar base for connection of said means for supporting an object to said modular support element.

5. The structure as claimed in claim 1 wherein said base comprises a generally planar top portion, a first generally frustro-conical side portion tapering downwardly, outwardly and connected to said top portion, a second generally frustro-conical side portion tapering downwardly and outwardly and at a different angle from said first side portion and connected thereto a generally vertical base portion connected to said second side portion, and means disposed in said planar top portion for connection of said base to said modular support element.

6. A structure comprising a modular support element comprising a generally rectangular sheet of stiff deformable material having means defining a generally circular opening in said sheet said opening having a diameter greater than one-half the width of said sheet, said sheet being deformed into a generally cylindrical shape with the two diametrically opposed corners of said sheet connected to each other, apertures for supporting said modular support element attached proximate the remaining unconnected diametrically opposed corners of said generally rectangular sheet.

* * * * *